United States Patent [19]

Cerrington et al.

[11] Patent Number: 4,841,797
[45] Date of Patent: Jun. 27, 1989

[54] LUBRICATION OF GEARING

[75] Inventors: Brian E. Cerrington, Sutton Coldfield; Michael W. Arrindell, Birmingham; Kenneth E. Cooper, Tamworth; Philip G. Isaacson, Sutton Coldfield, all of England

[73] Assignee: GKN Axles Limited, Birmingham, England

[21] Appl. No.: 174,851

[22] Filed: Mar. 29, 1988

[30] Foreign Application Priority Data

Apr. 3, 1987 [GB] United Kingdom ................ 8707984

[51] Int. Cl.⁴ .................... F16H 57/04; F01M 11/02; F16N 7/36
[52] U.S. Cl. .................................... 74/467; 184/6.12
[58] Field of Search ......................... 74/467; 184/6.12

[56] References Cited

U.S. PATENT DOCUMENTS

| 1,220,810 | 3/1917 | Alquist | 74/467 |
| 1,220,811 | 3/1917 | Alquist | 74/467 |
| 1,554,081 | 9/1925 | Garrett | 184/6.12 |
| 1,971,781 | 8/1934 | Henderson et al. | 74/467 |
| 4,271,717 | 6/1981 | Millward et al. | 74/467 |
| 4,359,909 | 11/1982 | Sogo | 74/467 |
| 4,721,184 | 1/1988 | Sowards | 184/6.12 |

FOREIGN PATENT DOCUMENTS

| 166658 | 1/1986 | European Pat. Off. | 74/467 |
| 1045820 | 12/1958 | Fed. Rep. of Germany | 184/6.12 |
| 57-86695 | 5/1982 | Japan | 184/6.12 |
| 983361 | 12/1982 | U.S.S.R. | 184/6.12 |
| 2042650 | 9/1980 | United Kingdom | 74/467 |

Primary Examiner—Allan D. Herrmann
Attorney, Agent, or Firm—Marshall, O'Toole, Gerstein, Murray & Bicknell

[57] ABSTRACT

A gear assembly comprising a lower gear wheel (18) and an upper gear wheel (19) contained within a housing (10, 11), the lower gear wheel being supported by bearings (20, 21) and the upper gear wheel by bearings (22, 23). The housing has wall portions (32, 34, 35, 36) which extend close to the periphery of the gear wheels so that lubricating oil, fed from a chamber (30), is entrained by the gear wheels and carried to the top of gear wheel (19) where it is diverted and fed through passages to the bearings (22, 23). Further oil carried by the upper gear wheel is diverted to passages leading to the bearings (20, 21), and excess circulating oil is returned to the chamber (30) by way of an opening (39).

4 Claims, 2 Drawing Sheets

LUBRICATION OF GEARING

BACKGROUND TO THE INVENTION

Field Of The Invention

This invention relates to the lubrication of gearing including two intermeshing gear wheels one of which is positioned generally above the other. There are many situations where such gearing is used, but the particular example described hereafter is intended for inclusion in the drive line of a motor vehicle.

In any gearing assembly wherein one or more gear wheels are disposed above another gear wheel or wheels, there is a potential problem in connection with lubrication of the uppermost wheel or wheels, particularly in respect of lubrication of the bearings rotatably supporting the upper wheel(s). To provide a sufficient level of lubricating oil in a housing containing the gearing to ensure lubrication of such parts is not desirable because of losses caused by the complete immersion of rotating gear wheels in the lubricant. Lubrication is a particular problem at high rotational speeds, and it is the object of the present invention to provide for efficient gear wheel and bearing lubrication in a gearing assembly designed for high speed operation.

SUMMARY OF THE INVENTION

According to the invention, we provide a gearing assembly comprising a housing; two intermeshing gear wheels disposed in said housing, one of said gear wheels being positioned generally above the other; and bearing means supporting said gear wheels in said housing for rotation about respective axes; wherein said housing affords a chamber for receiving liquid lubricant; a passage for feed of lubricant from said chamber to a lower part of the periphery of the lower gear wheel; wall portions extending close to peripherally extending parts of both said gear wheels, so that lubricant is fed by entrainment by said gear wheels to an upper region on the periphery of the upper gear wheel; a formation a said upper region for deflecting some of said lubricant from said upper gear wheel; passage means extending from said formation to convey said lubricant therefrom to the bearing means for said upper gear wheel; a further formation for entrapping further lubricant entrained by said upper gear wheel; further passage means extending from said further formation to said bearing means for said lower gear wheel; and aperture means extending from a region adjacent the meshing between said gear wheels, and leading to said chamber for return of lubricant thereto.

The bearing means supporting each of said gear wheels in the housing may comprise a taper roller bearing assembly at each side of the gear wheel. It is well known that such bearings act as centrifugal pumps in use, tending to cause pumping of lubricant from the smaller diameter end of the bearing to the larger diameter end of the bearing, and preferably the passage means supplying lubricant to such bearings lead to the sides of the bearings remote from the gear wheels. Lubricant will then flow through such bearings, in use, towards the gear wheels to join the streams of lubricant entrained thereby. Continuous circulation of lubricant in the gear wheels and bearings is thus obtained. The bearing means may, however, be of a type other than taper roller bearings, e.g. ordinary ball races, and in that case the lubricant will still flow through such bearings to be circulated as above described.

BRIEF DESCRIPTION OF DRAWINGS

The invention will now be described by way of example with reference to the accompanying drawings, of which.

DESCRIPTION OF PREFERRED EMBODIMENTS

Figure 1:
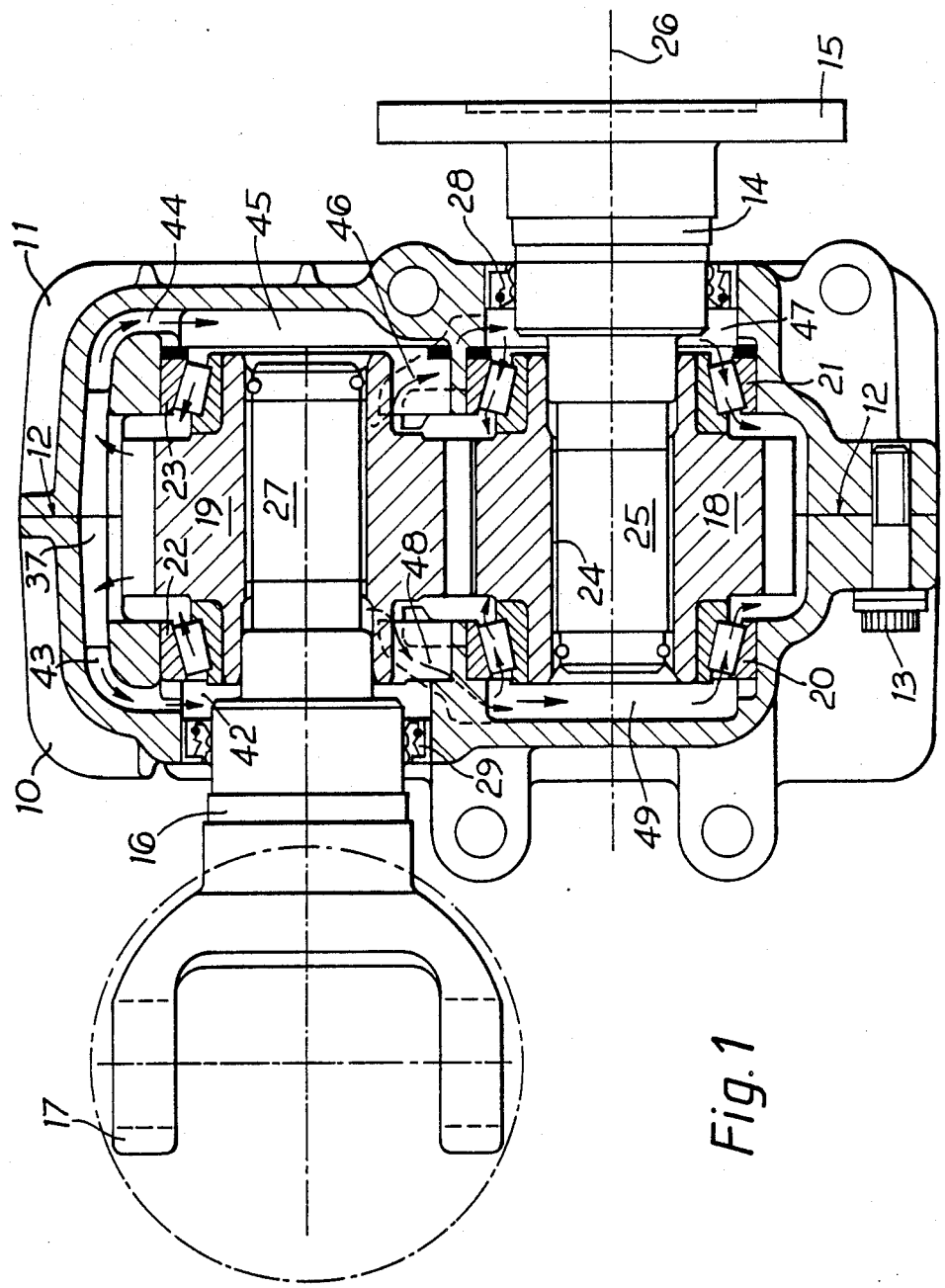
FIG. 1 is a longitudinal section through a gearing assembly according to the invention, on the line 1—1 of FIG. 2.

The illustrated gearing assembly is intended to be incorporated in the drive line of a motor vehicle, and particularly to provide for drive between rotary components whose axes of rotation are offset from one another. The gearing provides for reversal of the direction of rotation between such offset rotary components, and may, for example, find application in a vehicle's propeller shaft system between an engine-gearbox unit and a drive axle of the vehicle. It will be appreciated, however, that the principle of the invention as described hereafter is applicable to gearing assemblies for application other than to motor vehicles.

The gearing assembly comprises a housing which is in two parts 10, 11 which meet along a joint face 12 and are held together by bolts as 13. Input and output elements of the gearing are constituted by a shaft 14 having a drive flange 15, and a shaft 16 having a Hookes joint yoke 17.

Within the housing 10, 11 there is supported a lower gear wheel 18 and an upper gear wheel 19, which gear wheels mesh with one another. The lower gear wheel 18 is rotatably supported by taper roller bearing assemblies 20, 21 whose inner races are seated on spigots of the gear wheel and whose outer races are held in the housing parts 10, 11. The upper gear wheel 19 is similarly supported in the housing by taper roller bearing assemblies 22, 23. Gear wheel 18 has a splined bore 24 which receives a splined portion 25 of shaft 14 hence supporting the latter about the rotational axis (indicated at 26) of the gear wheel 18. Similarly the shaft 16 is supported, with a splined end portion 27, by the gear wheel 19. An oil seal 28 is held in the housing part 11 where shaft 14 emerges therefrom, and cooperates with the shaft to prevent escape of lubricant thereat. Similarly, an oil seal 29 engages the shaft 16.

Figure 2:
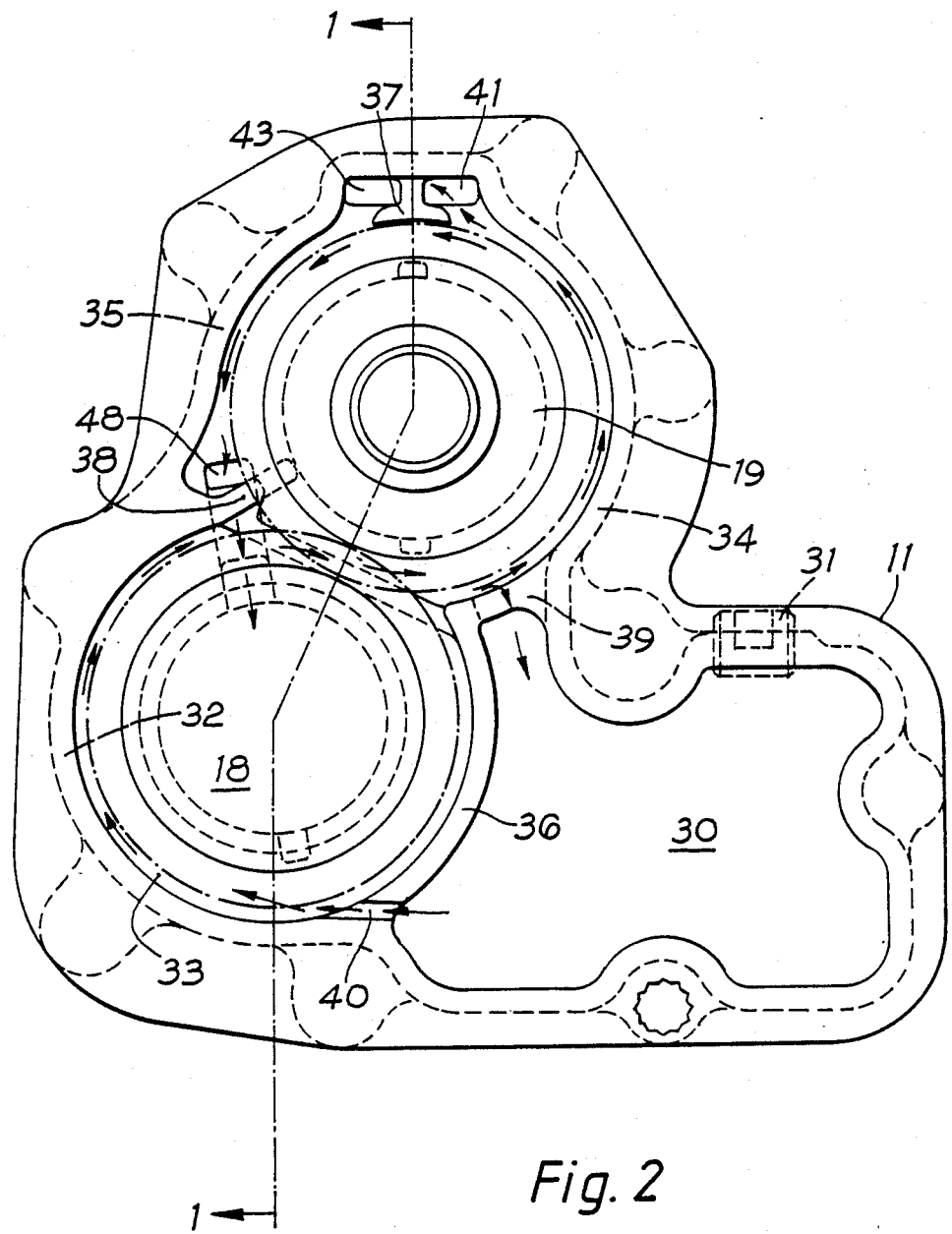
FIG. 2 is a transverse section through the assembly.

In addition to supporting the gear wheels 18, 19 by their respective taper roller bearing assemblies, the housing parts 10, 11 also define a chamber 30 for receiving lubricating oil. A filler plug for introduction of oil to the chamber 30 is indicated at 31. The housing parts 10, 11 have wall portions which extend close to the toothed periphery of the gear wheels 18, 19, as follows:

a wall portion 32 extending close to the periphery of gear wheel 18 so as to define a narrow arcuate space 33 therewith, extending from the lowermost part of gear wheel 18 to a position adjacent the point of mesh of the gear wheels 18, 19;

a wall portion 34 extending close to the periphery of gear wheel 19 on the side thereof which is travelling upwardly in the normal direction of rotation thereof as indicated on FIG. 2;

a wall portion 35 extending peripherally of gear wheel 19 adjacent a part thereof which is moving downwardly in the normal direction of rotation thereof;

a wall portion 36 extending peripherally of gear wheel 18, opposite the wall portion 32.

Between wall portions 34, 35 extending peripherally of gear wheel 19, there is a formation 37 which extends very close to the periphery of gear wheel 19, along the length of its teeth. Between wall portions 32 and 35, a projecting formation 38 extends towards the toothed periphery of gear wheel 19. Between wall portions 34, 36, an opening 39 leads into the upper part of chamber 30. Between wall portions 36 and 32, a relatively small aperture 40 leads from the chamber 30 to the part-annular space 33 adjacent the lowest point on gear wheel 18.

On one side of formation 37 (the side facing the normal direction of rotation of gear wheel 19), as viewed in FIG. 2, a passage 41 extends in one axial direction to lead into an annular space 42 surrounding shaft 16 between the oil seal 29 and the taper roller bearing assembly 22. On the opposite side of formation 37, a further passage 43 extends in the same axial direction as passage 41 to merge with the latter and lead into the annular space 42. On opposite sides of formation 37 in the other axial direction, there extend passages which merge at 44 to lead into a space 45 beyond the taper roller bearing assembly 23.

The formation 38 defines a shallow trough, from which a passage 46 leads in one axial direction to an annular space 47 surrounding shaft 14 between the bearing assembly 21 and oil seal 28. In the opposite axial direction, a passage 48 leads to a space 49 beyond the bearing assembly 20.

The operation of the gearing assembly and the flow of oil therein will now be described. The arrows shown on FIGS. 1 and 2 indicate the flows of oil which occur when the gear wheels of the assembly are rotating in their normal direction of rotation as indicated on FIG. 2. For a motor vehicle, this will be when the vehicle is travelling forwards.

From the chamber 30, oil passes through the aperture 40 to enter the space 33 around the periphery of gear wheel 18. Oil is entrained by such gear wheel both between each adjacent pair of teeth thereof and radially outwardly of the teeth in the part-annular space 33, and carried to the part thereof which meshes with the gear wheel 19. Some of the oil will then be entrained by the gear wheel 19 and carried to the upper part thereof, while some of the oil leaving the region of meshing of the gear wheels will be displaced to re-enter chamber 30 by way of opening 39. At the top of gear wheel 19, the formation 37, which extends close to the toothed periphery of the gear wheel, removes that part of the entrained oil, which is not between the teeth of the gear wheel, from the gear wheel and causes it to enter the passages 41, 44 and be fed to the spaces 42, 45 on opposite sides of the bearings 22, 23. Beyond formation 37, entrained oil between the teeth of the gear, and which has thus not been removed from the gear wheel will be carried downwardly thereby and thrown outwardly to run down wall portion 35 and be retained by the trough defined by formation 38. Such oil is then fed by the passage 46 to the space 47, and the passage 48 to the space 49.

Oil fed to the spaces 42, 45, 47, 49 will flow through the respective taper roller bearings towards the toothed parts of the gear wheels where such oil will be centrifuged outwardly to join that entrained by the peripheral teeth of the gear wheels. Excess circulating oil will reach the region beyond the meshing region of the gear wheels, and return to chamber 30 by way of opening 39.

The relative dimensions of aperture 40 and opening 39 are chosen so that in use a substantial quantity of oil remains in the chamber 30, rather than being continuously in circulation around the gear wheels and their bearings. This provides for cooling of the oil, and reduction of losses due to excessive quantities of oil in circulation.

When the gearing rotates in the opposite direction to its normal direction, a certain amount of oil will be entrained by the gear wheels and carried to the top of gear wheel 19, although the presence of formation 38 will prevent as much oil reaching the formation 37 as reaches it in the normal direction of rotation. Such oil will be delivered through passages as 43 to lubricate the bearings for the upper gear wheel. Some oil will also flow through passages 46, 48 to lubricate the bearings for the lower gear wheel. However, sustained high speed operation will not arise in this opposite rotational direction and therefore a consistent steady state of oil circulation may not arise.

We claim:

1. A gearing assembly comprising a housing; two intermeshing gear wheels disposed in said housing, one of said gear wheels being positioned generally above the other; bearing means supporting said gear wheels in said housing for rotation about respective axes; a chamber for receiving liquid lubricant, said chamber being disposed in the housing substantially level with the lower one of said gear wheels but separated therefrom; a passage extending in said housing for feed of lubricant from a lower part of said chamber to a lower part of the periphery of said lower gear wheel; wall portions of said housing, extending close to and conforming to the shape of peripherally extending parts of both said gear wheels, so that lubricant is fed by entrainment by said gear wheels to an upper region on the periphery of the upper gear wheel; a formation at said upper region for deflecting some of said lubricant from said upper gear wheel; passage means extending from said formation to convey said lubricant therefrom to the bearing means for said upper gear wheel; a further formation at a lower position on said upper gear wheel for entrapping further lubricant entrained thereby; further passage means extending from said further formation to said bearing means for said lower gear wheel; and aperture means extending from a region adjacent the meshing between said gear wheels, and leading to an upper part of said chamber for return of lubricant thereto.

2. A gearing assembly according to claim 1 wherein said bearing means supporting each of said gear wheels comprises a taper roller bearing assembly at each side of the gear wheel, and the passage means for lubricant supply lead to the sides of such bearing assemblies remote from the gear wheels.

3. A gearing assembly according to claim 1 wherein said formation at said upper region, for deflecting lubricant from said upper gear wheel, extends downward from said housing, and said passage means extends from the side of said formation facing the normal direction of rotation of said gear wheel, as viewed parallel to the axis of rotation of said gear wheel.

4. A gearing assembly according to claim 3, further comprising passage means at the opposite side of said formation, for conveying lubricant deflected from said upper gear wheel when it is rotating in the opposite direction to its normal direction of rotation.

* * * * *